United States Patent
Warashina et al.

(10) Patent No.: US 6,722,041 B2
(45) Date of Patent: Apr. 20, 2004

(54) PLANT CUTTER APPARATUS

(75) Inventors: Makoto Warashina, Wako (JP); Hiroaki Uchitani, Wako (JP); Hideshi Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/078,858

(22) Filed: Feb. 19, 2002

(65) Prior Publication Data

US 2002/0116828 A1 Aug. 29, 2002

(30) Foreign Application Priority Data

Feb. 27, 2001 (JP) ......................................... 2001-052958

(51) Int. Cl.[7] ............................................... A01D 34/68
(52) U.S. Cl. ........................................................ 30/276
(58) Field of Search ...................... 30/276, 347; 56/12.7

(56) References Cited

U.S. PATENT DOCUMENTS

2002/0166239 A1 * 11/2002 Weissert et al. .............. 30/276

* cited by examiner

*Primary Examiner*—Douglas D. Watts
(74) *Attorney, Agent, or Firm*—Adams & Wilks

(57) ABSTRACT

Drive shaft of a plant cutter apparatus includes an elongate main shaft portion made of a titanium alloy, and end shaft portions made of steel and integrally joined to the opposite ends of the main shaft portion. The titanium alloy has substantially the same mechanical strengths as the steel. Therefore, the titanium-alloy-made main shaft portion can secure rigidity that is normally required of the plant cutter's drive shaft, and can also reduce the weight of the drive shaft to thereby minimize unwanted sagging-induced vibrations of the drive shaft caused by the shaft's own weight.

20 Claims, 4 Drawing Sheets

PLANT CUTTER APPARATUS

FIELD OF THE INVENTION

The present invention relates generally to plant cutter apparatus for cutting unwanted plants such as bushes, weeds or grass, and more particularly to an improved drive shaft for use in plant cutter apparatus to transmit driving force of a prime mover or drive source unit, such as an engine or electric motor, to a cutter blade.

Generally, weeds growing on footpaths between rice fields etc. have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a drive shaft or driving-force transmission shaft, which is passed through a handling rod, is rotated via an engine provided at one end of the handling rod so as to rotate a cutter blade provided at the other end of the handling rod. In most cases, a human operator hangs the weed cutter on his or her shoulder using a hanging belt, and cuts weeds with the rotating cutter blade by gripping a U-shaped handle provided on an intermediate position of the handling rod to swing the handling rod in front-and-rear and left-and-right directions.

In recent years, there have been strong demands for further improvements in agricultural working environment. In the case of the shoulder-hung weed cutters, there is an increasing demand for reduction in vibrations that are transmitted from the driving-force transmission shaft via the handling rod to the U-shaped handle, with a view to lowering the load on the human operator. The driving-force transmission shaft, passed through the handling rod, has a relatively great length and is thus liable to sag relatively greatly due to its own weight, which would result in so-called "sagging-induced vibrations" or "sagging vibrations" when the engine is activated. It has been conventional to minimize the sagging vibrations using any one of the following two measures. The first measures are to support the driving-force transmission shaft via a number of bearings disposed on the shaft and spaced apart from each other along the shaft's axis in such a manner that small shaft lengths are supported separately between the bearings, and the second measures are to reduce the weight of the driving-force transmission shaft. The first measures, however, are not satisfactory in that the provision of the many bearings presents structural limitations and considerably increases the overall weight of the weed cutter. Therefore, the second measures of reducing the weight of the driving-force transmission shaft itself are being given more consideration today. Specifically, in order to reduce the weight of the conventional driving-force transmission shaft that is in the form of a steel rod or steel pipe, it is conceivable to form the driving-force transmission shaft into a smaller diameter or into a pipe shape having a small wall thickness or make the transmission shaft of a light weight material. However, because the function of the driving-force transmission shaft is to transmit the driving source from the engine to the cutter blade, the driving-force transmission shaft has to have more than predetermined rigidity against torsional and bending force, and thus the option of forming the driving-force transmission shaft into a smaller diameter or into a pipe shape having a small wall thickness is subject to limitations. Further, as the option of making the transmission shaft of a lightweight material, it is conceivable to use an aluminum alloy material; however, such an aluminum alloy material can not achieve necessary rigidity although it is, to be sure, light in weight.

Specific examples of the weed cutters where the driving-force transmission shaft is made of a lightweight material are known, for example, from Japanese Utility Model Publication No. HEI-1-30995 and Japanese Patent Laid-Open Publication No. HEI-8-205649.

Namely, in the weed cutter disclosed in the HEI-1-30995 utility model publication, the driving-force transmission shaft, passed through the handling rod formed into a pipe shape, is driven via the drive source unit to rotate the cutter blade mounted at the distal end of the handling rod. Here, the transmission shaft is made of a resin material lighter in weight than the conventional steel material, in order to reduce the undesired sagging vibrations of the shaft. However, because the resin-made transmission shaft generally has low torsional and bending rigidity, there is a need to make up for the lack of the rigidity in some way. If the diameter of the transmission shaft is increased to secure the necessary rigidity, the weight saving objective can not be accomplished. Further, according to the disclosure of the HEI-1-30995 utility model publication, it is not clear how the transmission shaft is connected to the output shaft of the drive source unit and cutter blade. Furthermore, since the output shaft of the drive source unit and cutter blade are metal-made component parts, it is not easy to reliably connect the resin-made transmission shaft to the metal-made output shaft and cutter blade with sufficient coupling strength.

In the plant cutter disclosed in the above-mentioned HEI-8-205649 patent laid-open publication, the driving-force transmission shaft is in the form of a pipe made of fiber-reinforced resin. Metal-made joints are fitted in and adhered to the opposite ends of the pipe-shaped transmission shaft by an adhesive agent. Outer peripheries at the ends of the transmission shaft, to which the metal-made joints are adhered, are tightened by means of reinforcing rings so as to more firmly fix the joints and thereby increase the over all rigidity of the pipe-shaped transmission shaft made of the fiber-reinforced resin. However, if the same rigidity as the steel is required of the thus-constructed transmission shaft (i.e. pipe made of the fiber-reinforced resin), there would unavoidably arise a need to increase the diameter and wall thickness of the transmission shaft. Increasing the diameter of the transmission shaft is unadvisable because it also requires an increase in the diameter of the handling rod through which the transmission shaft is passed. Further, fixing the metal-made joints to the pipe-shaped transmission shaft made of the fiber-reinforced resin in the above-mentioned manner would result in a complicated structure. In addition, the transmission shaft can not achieve sufficient durability at and around the ends where the metal-made joints are fixed to the resin-made transmission shaft.

SUMMARY OF THE INVENTION

In view of the foregoing, it is a first object of the present invention to provide a plant cutter apparatus which can minimize vibrations of a drive shaft while maintaining necessary drive shaft's rigidity without having to increase the diameter of the drive shaft.

It is a second object of the present invention to provide a plant cutter apparatus which allows a drive shaft to be reliably connected to the output shaft of a drive source unit and a cutter blade and which can achieve sufficient durability in portions of the transmission shaft that are connected to the output shaft of the drive source unit and cutter blade.

According to the present invention, there is provided an improved plant cutter apparatus which comprises a pipe-shaped handling rod, a drive shaft passed through the pipe-shaped handling rod, a drive source unit mounted at one end of the handling rod for rotating the drive shaft and a cutter blade mounted at the other end of the handling rod for being rotated by the rotation, via the drive source unit, of the drive shaft, and which is characterized in that the drive shaft is a different-metal-combined shaft that includes a main shaft portion made of a titanium alloy, and end shaft portions made of steel and integrally joined to the opposite ends of the main shaft portion.

The titanium alloy has substantially the same mechanical strengths (torsional strength, bending strength, longitudinal elasticity coefficient, etc.) as the steel, and has a specific gravity smaller than that of the steel. Particularly, because the main shaft portion is pipe-shaped, it can be even lighter in weight. Therefore, the titanium-alloy-made main shaft portion can sufficiently secure torsional and bending rigidity that is normally required of the plant cutter's drive shaft, even where the main shaft portion has the same diameter as the conventional counterparts. Further, the use of the light-weight titanium-alloy-made main shaft portion can significantly reduce unwanted "sagging-induced vibrations" of the drive shaft that tend to be caused by the shaft's own weight.

Furthermore, with the inventive arrangement that the steel-made end shaft portions are integrally joined to the opposite ends of the titanium-alloy-made main shaft portion, it is possible to secure durability in the portions of the drive shaft where the end shaft portions are joined to the main shaft portion. In addition, the opposite ends of the drive shaft, i.e. the two end shaft portions, can be coupled reliably to the output shaft of the drive source unit and the cutter blade with sufficient durability. It is preferable that the two end shaft portions be made of carbon steel for machine structural use.

Preferably, the end shaft portions are fitted in the opposite ends, respectively, of the main shaft portion and integrally joined to the respective ends by vacuum brazing. Thus, the drive shaft can secure sufficient rigidity against any possible bending force applied to the portions where the end shaft portions are fitted in the main shaft portion.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
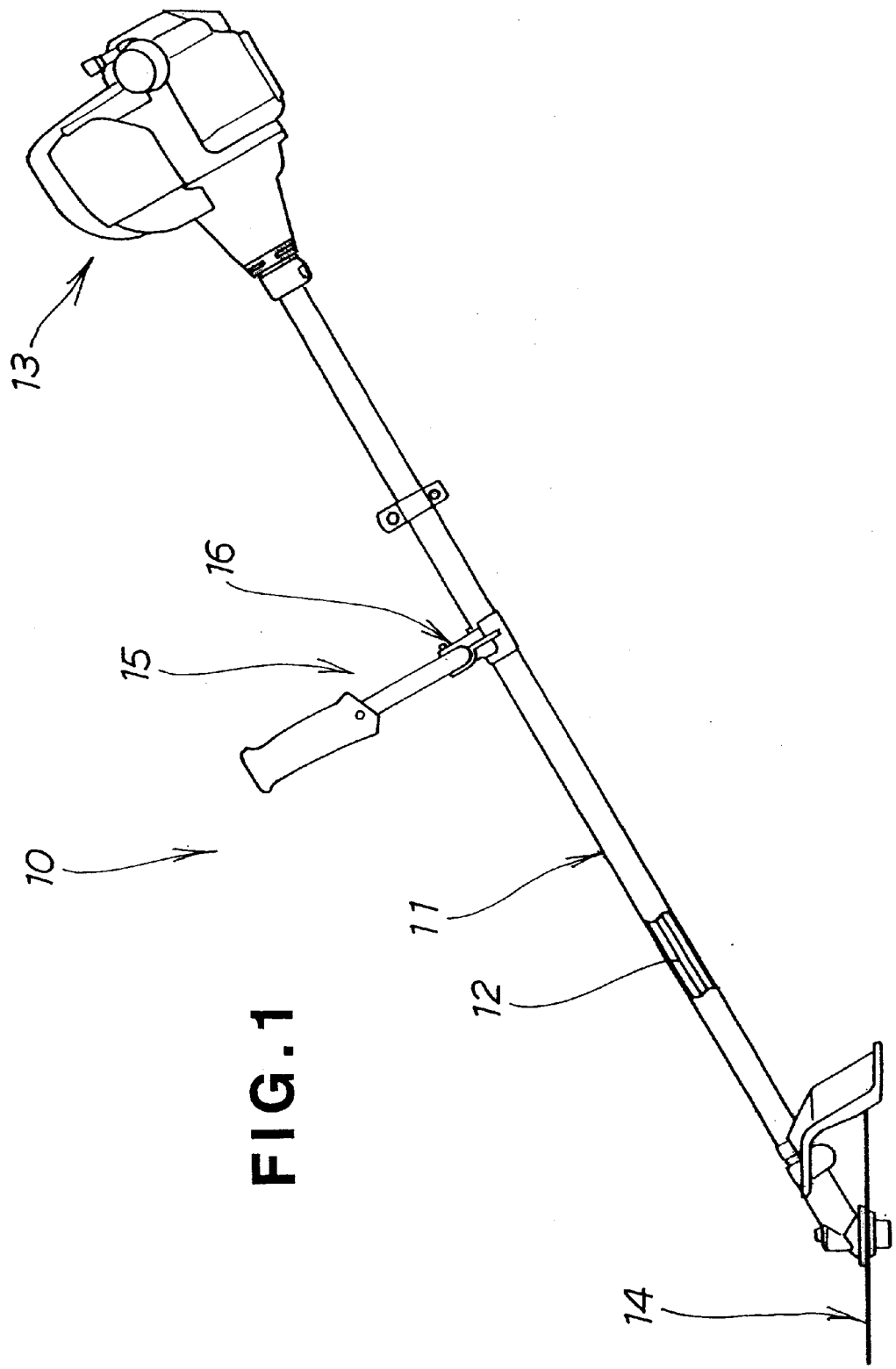
FIG. 1 is a view showing a plant cutter apparatus provided with a drive shaft in accordance with an embodiment of the present invention.
Figure 2:
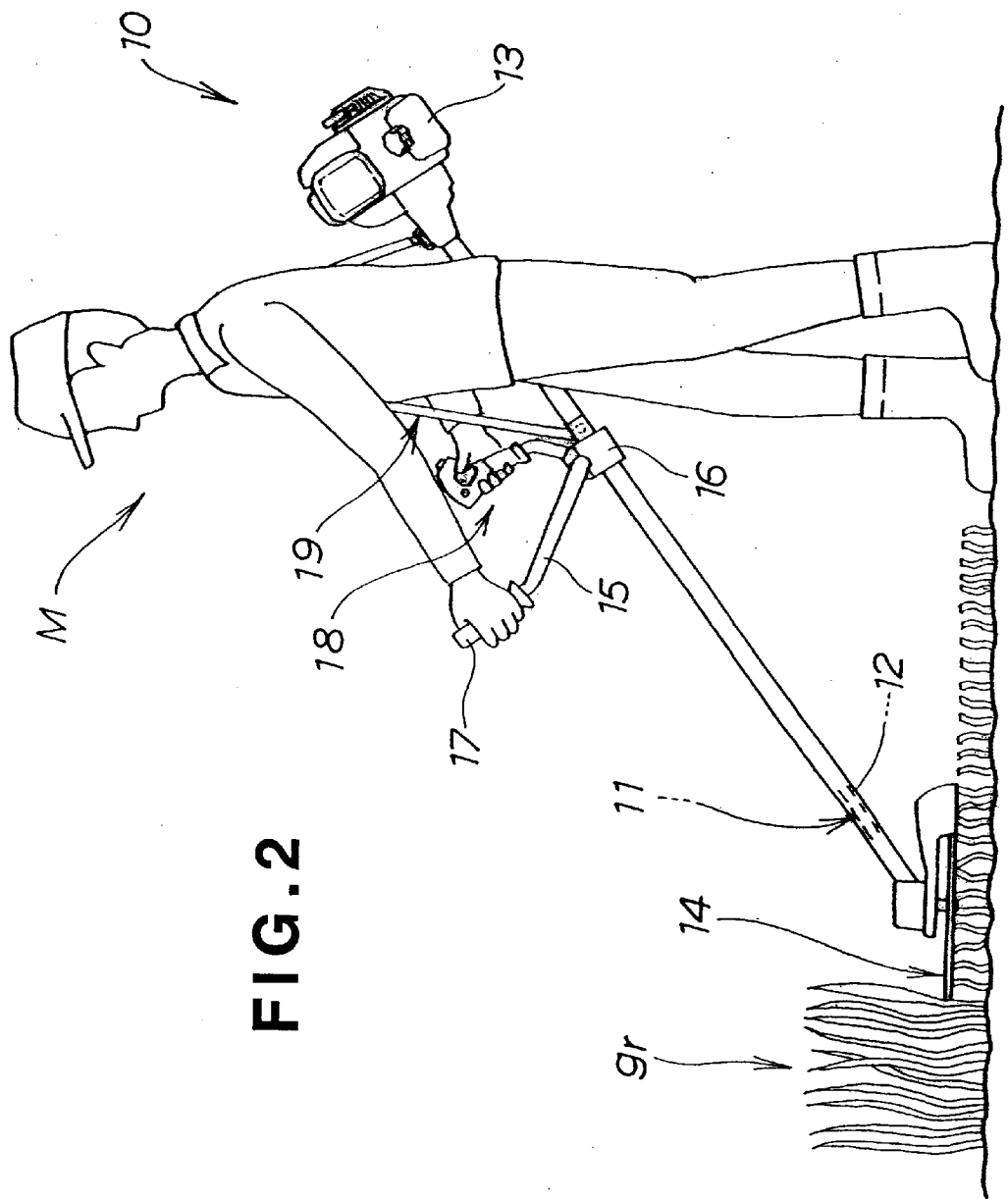
FIG. 2 is a view explanatory of a manner in which the plant cutter apparatus of FIG. 1 is used to cut weeds.

FIGS. 1 and 2 show a plant cutter apparatus 10 in accordance with the present invention that is designed to cut unwanted plants such as bushes, weeds or grass. The plant cutter apparatus 10 includes a pipe-shaped handling rod 11, a driving-force transmission shaft or drive shaft 12 passed through the handling rod 11, a prime mover or drive source unit 13, such as an engine or electric motor, mounted at one end of the handling rod 11, and a cutter blade 14 mounted at the other end of the handling rod 11. The drive shaft 12 can be rotated by activation of the drive source unit 13 so that the cutter blade 14 can be rotated by the drive source unit 13 via the drive shaft 12. The plant cutter apparatus 10 also includes a U-shaped handle 15 that is mounted on the handling rod 11 substantially at a longitudinally-middle portion thereof. Specifically, the handle 15 is fixed to the handling rod 11 by means of a handle holder 16, and has left and right grips 17 and 18. The right grip 18 of the handle 15 is an operator member provided with a throttle lever and lock lever for controlling the drive source unit 13.

As seen in FIG. 2, a human operator M can shoulder the plant cutter apparatus 10 on his or her shoulder using a hanging belt 19 secured at its opposite ends to intermediate portions of the handling rod 11. The human operator M can cut weeds gr by causing the cutter blade 14 to rotate via the drive source unit 13 while swinging the cutter blade 14 in front-and-rear and left-and-right directions using the grips 17 and 18.

Figure 3:
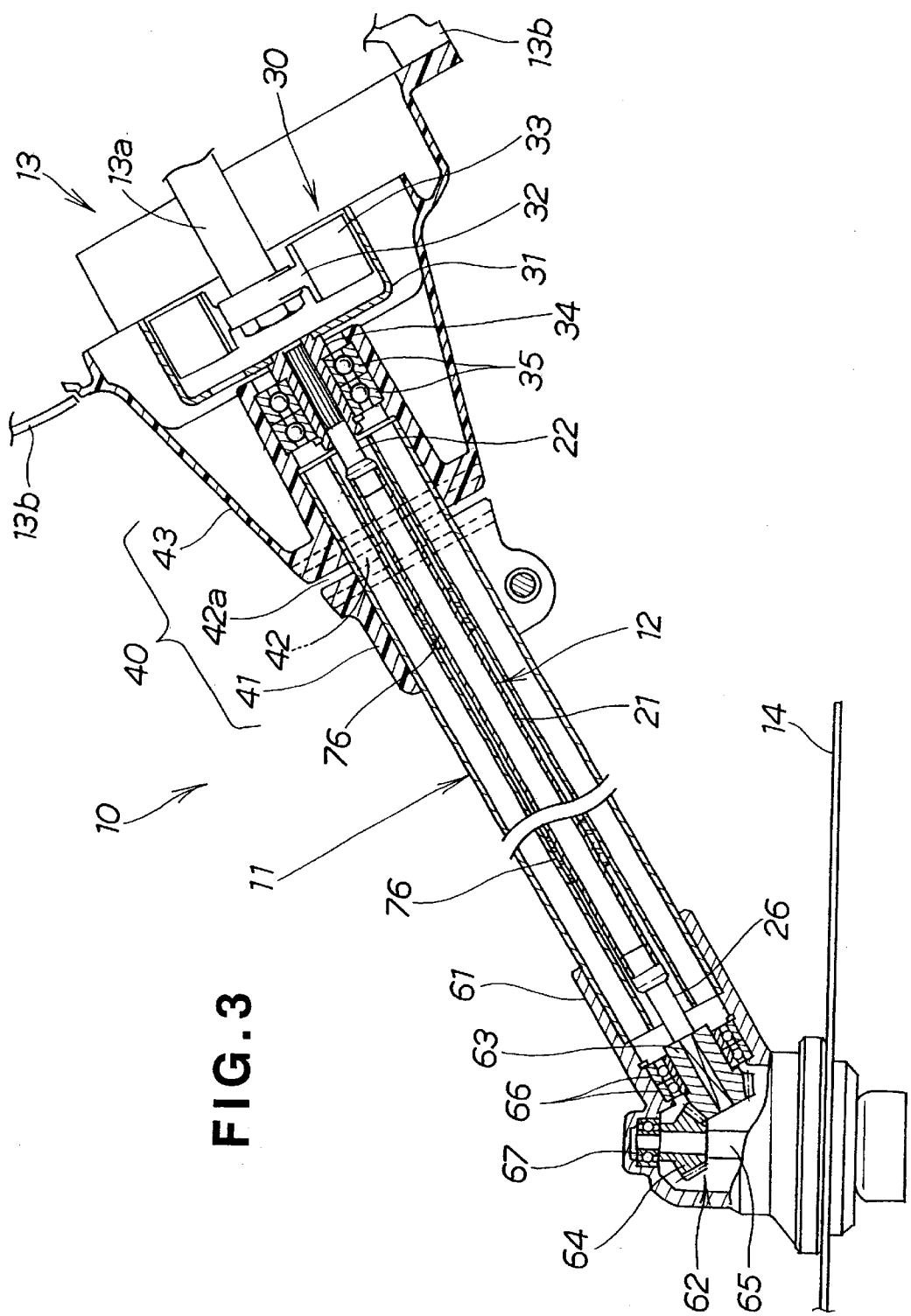
FIG. 3 is a sectional view of the plant cutter apparatus provided with the drive shaft.

FIG. 3 is a sectional of the plant cutter apparatus 10, which particularly shows a clutch mechanism 30 that is accommodated in a clutch case 40 and provided between the drive shaft 12 and an output shaft 13a of the drive source unit 13. Namely, the drive source unit 13 is mounted at the one end of the handling rod 11 via the clutch mechanism 30. In the plant cutter apparatus 10, the handling rod 11 and drive shaft 12 are positioned co-axially with the output shaft 13a of the drive source unit 13.

The clutch mechanism 30 is a centrifugal clutch, which includes a clutch drum 31 that is spline-coupled with one of two end shaft portions of the drive shaft 12 closer to the drive source unit 13 (i.e., drive-side end shaft portion 22), a rotation member 32 connected to the output shaft 13a of the drive source unit 13 and a clutch member 33 that brings the rotation member 32 into engagement with the clutch drum 31 only when the rotation member 32 is turning at high speed.

The clutch case 40 is an integrally-molded component part made of a resin material, which includes a handling-rod mounting portion 41 for attachment thereto of one end portion of the handling rod 11, a flexible coupling portion 42 having flexibility because of a groove 42a formed therein to extend from the handling-rod mounting portion 41 toward the drive source unit 13 and a drive-source mounting portion 43 extending from the flexible coupling portion 42 to the drive source unit 13 for attachment thereto of the drive source unit 13. The drive-source mounting portion 43 is bolted to a case 13b of the drive source unit 13.

The cutter blade 14 is rotatably connected to the other end of the handling rod 11 via a transmission mechanism case 61. The transmission mechanism case 61 accommodates therein a transmission mechanism 62 disposed between the drive shaft 12 and the cutter blade 14. The transmission mechanism 62 includes a driving bevel gear 63 connected to the other end shaft portion of the drive shaft 12 closer to the cutter blade 14 (i.e., cutter-side end shaft portion 26), a driven bevel gear 64 meshing with the driving bevel gear 63, and a driven shaft 65 having mounted thereon the driven bevel gear 64 and cutter blade 14.

The drive shaft 12 is rotatably supported at a plurality of positions spaced from each other in its longitudinal direction, as described below.

First, the one end portion of the drive shaft 12 is rotatably supported by the drive-source mounting portion 43 via a boss 34 and a plurality of bearings 35. Specifically, the drive-side end shaft portion 22 of the drive shaft 12 is spline-coupled to the boss 34 of the clutch drum 31, and the boss 34 is supported via the plurality of bearings 35.

Second, the other end portion of the drive shaft 12 is rotatably supported by the transmission mechanism case 61 via the driving bevel gear 63 and a plurality of bearings 66. Specifically, the cutter-side end shaft portion 26 of the drive shaft 12 is coupled with the driving bevel gear 63, and the driving bevel gear 63 is supported via the plurality of bearings 66.

Third, an intermediate portion of the drive shaft 12 between the drive-side end shaft portion 22 and the cutter-side end shaft portion 26 is rotatably supported by the handling rod 11 via a plurality of bushings 76 provided on the drive shaft 12 and spaced from each other at uniform intervals in the longitudinal direction thereof. Note that reference numeral 67 in FIG. 3 represents bearings for supporting the driven shaft 65.

Figure 4:
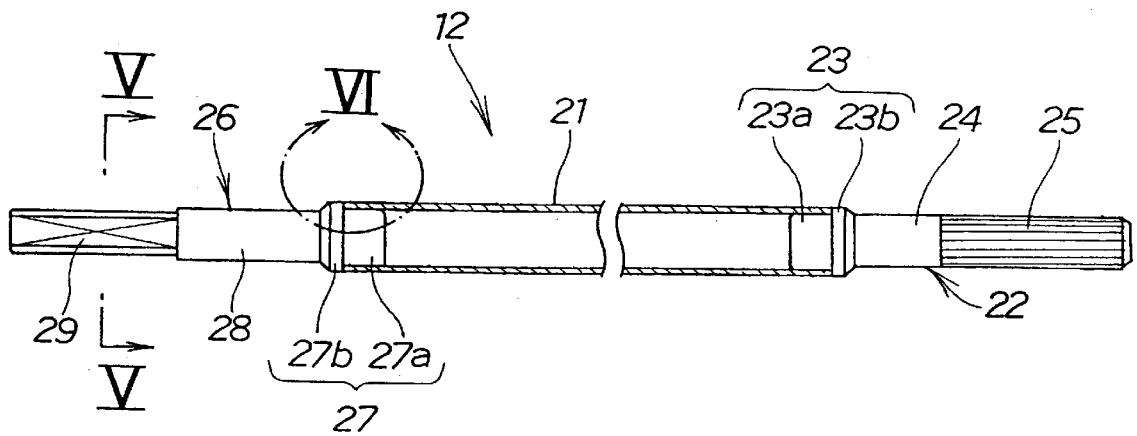
FIG. 4 is a sectional view of the drive shaft taken along an axis thereof.
Figure 5:
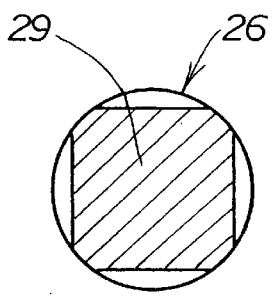
FIG. 5 is an enlarged sectional view taken along the V—V line of FIG. 4.
Figure 6:
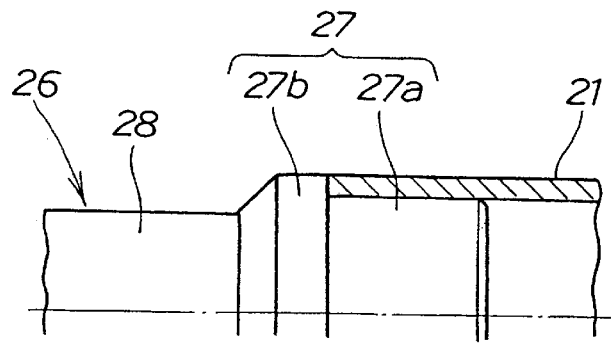
FIG. 6 is an enlarged sectional view taken along the VI—VI line of FIG. 4 and showing how a cutter-side end shaft portion of the drive shaft is attached to a main shaft portion.

FIG. 4 is a sectional view of the drive shaft 12 taken along the axis thereof, FIG. 5 is an enlarged sectional view taken along the V—V line of FIG. 4, and FIG. 6 is an enlarged sectional view taken along the VI—VI line of FIG. 4 and showing how the cutter-side end shaft portion 26 is attached to a main shaft portion 21. In the instant embodiment, the drive shaft 12 is a different-metal-combined shaft, which is made of a combination of different kinds of metals. Specifically, the main shaft portion 21 is made of a titanium alloy, and the drive-side end shaft portion 22 and the cutter-side end shaft portion 26, both made of steel, are integrally joined to the opposite ends of the main shaft portion 21. For example, the main shaft portion 21 is in the form of a titanium-alloy pipe having an outer diameter of 7 mm and a length of 1,500 mm.

The drive-side end shaft portion 22 is, for example, in the form of a rod having a circular section that is formed of carbon steel for machine structural use (machine-structural-use carbon steel). The drive-side end shaft portion 22 has its proximal end part 23 fitted in one end of the pipe-shaped main shaft portion 21 and integrally joined to the one end by vacuum brazing, and a distal end part 24 of the drive-side end shaft portion 22 has male splines 25 formed thereon.

The cutter-side end shaft portion 26 is, for example, in the form of a rod having a circular section that is formed of machine-structural-use carbon steel. The cutter-side end shaft portion 26 has its proximal end part 27 fitted in the other end of the pipe-shaped main shaft portion 21 and integrally joined to the other end by vacuum brazing, and a distal end part 28 of the cutter-side end shaft portion 26 is chamfered to provide a fitting shaft portion 29 of a rectangular section as illustrated in FIG. 5.

As seen in FIG. 6, the proximal end part 27 of the cutter-side end shaft portion 26 has a smaller-diameter region 27a fitted in the opening of the other end of the pipe-shaped main shaft portion 21, and a larger-diameter region 27b partly abutting against the end surface of the main shaft portion 21. By only fitting a necessary length of the smaller-diameter region 27a in the opening of the pipe-shaped main shaft portion 21, the drive shaft 12 can secure sufficient rigidity against any possible bending force applied to the portion where the region 27a is fitted in the main shaft portion 21. After completion of the fitting of the smaller-diameter region 27a, the cutter-side end shaft portion 26 and main shaft portion 21 are integrally joined with each other by vacuum-brazing the opposed end surfaces of the larger-diameter region 27b of the end shaft portion 26 and main shaft portion 21.

The proximal end part 23 of the drive-side end shaft portion 22 also has a smaller-diameter region 23a and a large-diameter region 23b, and the drive-side end shaft portion 22 is joined to the main shaft portion 21 in generally the same manner as shown in FIG. 6 in relation to the cutter-side end shaft portion 26.

In the instant embodiment, the "vacuum brazing" is, for example, furnace brazing that is carried out in a clean space with a vacuum brazing environment in the range of $133 \times 10^{-3}$ Pa to $133 \times 10^{-7}$ Pa.

The titanium alloy has substantially the same mechanical strengths (torsional strength, bending strength, longitudinal elasticity coefficient, etc.) as the steel. Therefore, the titanium-alloy-made main shaft portion 21 in the instant embodiment can sufficiently secure torsional and bending rigidity that is normally required of the plant cutter's drive shaft, even where the main shaft portion 21 has the same diameter as the conventional counterparts.

Further, whereas the steel has a specific gravity of about 7.8, the titanium alloy has a specific gravity of about 4.5; namely, the specific gravity of the titanium alloy is very much smaller than that of the steel. Thus, the titanium-alloy-made main shaft portion 21 employed in the instant embodiment can minimize sagging vibrations caused by the own weight of the drive shaft 12. Consequently, it is possible to minimize, with simple construction, vibrations transmitted from the drive shaft 12 to the handle 15 via the handling rod 11 when the drive source unit 13 is activated, as a result of which the load on the human operator M can be lessened to a significant degree.

Furthermore, because the steel-made drive-side end shaft portion 22 and cutter-side end shaft portion 26 are integrally joined to the opposite ends of the titanium-alloy-made main shaft portion 21, it is possible to secure durability in the portions of the drive shaft 12 where the end shaft portions 22 and 26 are joined to the main shaft portion 21. In addition, the opposite ends of the drive shaft 12, i.e. the end shaft portions 22 and 26, can be coupled reliably to the output shaft 13a of the drive source unit 13 and the cutter blade 14 with sufficient durability.

Moreover, in the present invention, the steel-made drive-side end shaft portion 22 and cutter-side end shaft portion 26 may be integrally joined to the opposite ends of the titanium-alloy-made main shaft portion 21 by use of any other suitable technique than the vacuum brazing, such as riveting, welding or adhesion.

The present disclosure relates to the subject matter of Japanese Patent Application No. 2001-052958, filed Feb. 27, 2001, the disclosure of which is expressly incorporated herein by reference in its entirety.

What is claimed is:

1. A vegetation cutting apparatus comprising: a pipe-shaped handling rod; a drive shaft extending through the pipe-shaped handling rod; a drive source unit mounted proximate a first end of the handling rod for rotating the drive shaft; and a cutter blade mounted proximate a second end of the handling rod opposite the first end for undergoing rotation with the drive shaft; wherein the drive shaft comprises a main shaft portion formed of a titanium alloy, and end shaft portions formed of steel and integrally joined to opposite ends of the main shaft portion.

2. A vegetation cutting apparatus according to claim 1; wherein the end shaft portions are each formed of carbon steel for machine structural use.

3. A vegetation cutting apparatus according to claim 1; wherein the main shaft portion of the drive shaft has a tubular configuration.

4. A vegetation cutting apparatus according to claim 3; wherein the end shaft portions are fitted in the opposite ends of the main shaft portion and integrally joined to the respective ends by vacuum brazing.

5. A vegetation cutting apparatus according to claim 4; wherein the opposite ends of the main shaft portion have a hollow opening and the end shaft portions have a reduced diameter portion fitted in the hollow openings of the main shaft portion and a larger diameter portion abutting the opposite ends.

6. A vegetation cutting apparatus according to claim 5; wherein one of the end shaft portions has a first end having a round cross section and a chamfered second end having a rectangular cross section.

7. A vegetation cutting apparatus according to claim 6; wherein the other end shaft portion has a first end having a round cross section and a second end having a rectangular cross section.

8. A vegetation cutting apparatus according to claim 4; wherein an outer diameter of the main shaft portion is 7 mm.

9. A vegetation cutting apparatus according to claim 1; further comprising rotary bearings disposed within the elongated rod for rotatably supporting the drive shaft.

10. A vegetation cutting apparatus according to claim 1; further comprising a throttle control lever incorporated in a grip of the handle mounted to the elongated rod.

11. A vegetation cutting apparatus according to claim 1; wherein the drive source unit is a gas-powered engine or an electric motor.

12. A vegetation cutting apparatus according to claim 1; further comprising a handle mounted to the pipe-shaped handling rod between the motor and the cutter blade; and a throttle control lever mounted to the handle for controlling a rotating speed of the drive source unit.

13. A vegetation cutting apparatus according to claim 1; wherein the end shaft portions are joined to the main shaft portion without a mechanical fastener.

14. A vegetation cutting apparatus comprising: an elongated rod; a motor connected to a first end of the rod; a drive shaft extending through the elongated rod and connected to undergo rotation with the motor and comprising a titanium alloy main shaft portion having hollow end portions and steel end portions having reduced diameter portions fitted into the respective hollow end portions of the main shaft portion and integrally joined thereto by vacuum brazing and without a mechanical fastening device, the end portions having larger diameter portions abutting opposite ends of the main shaft portion; a cutting tool mounted proximate a second end of the rod opposite the first end to undergo rotation with the drive shaft; a handle mounted to the rod between the motor and the cutting tool; a clutch mechanism interposed between the drive shaft and the motor for selectively disengaging the motor from the drive shaft; and a transmission mechanism interposed between the drive shaft and the cutting tool for conveying a drive force of the drive shaft to the cutting tool.

15. A vegetation cutting apparatus according to claim 14; wherein an outer diameter of the main shaft portion is 7 mm.

16. A vegetation cutting apparatus according to claim 14; wherein the clutch mechanism is a centrifugal clutch comprising a clutch housing interposed between the elongated rod and the motor, a clutch drum contained in the clutch housing and spline-coupled to the drive shaft, a rotation member contained in the clutch housing and connected to an output shaft of the motor, and a clutch member contained in the clutch housing for bringing the rotation member into engagement with the clutch drum only when the rotation member is rotating at or above a predetermined rate.

17. A vegetation cutting apparatus according to claim 16; wherein the clutch housing is formed of a resin material and has a rod mounting portion at one end for mounting to the rod, a flexible coupling portion provided with a groove, and a motor mounting portion extending from the groove to the motor and bolted to a housing of the motor.

18. A vegetation cutting apparatus according to claim 14; wherein the transmission mechanism comprises a transmission housing, a driving bevel gear contained in the transmission housing and connected to the drive shaft, a driven bevel gear contained in the transmission housing and meshing with the driving bevel gear, and a shaft extending from the transmission housing being connected at one end to the driven bevel gear and at another end to the cutting tool.

19. A vegetation cutting apparatus according to claim 18; wherein the transmission mechanism further comprises a plurality of rotary bearings disposed in the transmission housing for rotatably supporting the driven bevel gear, the bearings being spaced-apart along the length of the transmission housing.

20. A vegetation cutting apparatus according to claim 14; further comprising rotary bearings disposed within the elongated rod for rotatably supporting the drive shaft.

* * * * *